US008275327B2

(12) United States Patent
Yi et al.

(10) Patent No.: US 8,275,327 B2

(45) Date of Patent: Sep. 25, 2012

(54) WRIST WATCH TYPE MOBILE TERMINAL

(75) Inventors: Kyung-Hack Yi, Seoul (KR); Hyun-Jun Kim, Seoul (KR); Man-Su Shin, Seoul (KR); An-Sun Hyun, Seoul (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 12/611,801

(22) Filed: Nov. 3, 2009

(65) Prior Publication Data

US 2010/0112964 A1 May 6, 2010

(30) Foreign Application Priority Data

Nov. 4, 2008 (KR) ........................ 10-2008-0109112

(51) Int. Cl.
*H04B 5/02* (2006.01)

(52) U.S. Cl. .................. 455/90.3; 455/556.1; 455/575.1

(58) Field of Classification Search ............... 455/556.1, 455/575.1

See application file for complete search history.

(56) References Cited

U.S. PATENT DOCUMENTS

| | | | | |
|---|---|---|---|---|
| 4,901,291 | A * | 2/1990 | Kurata | 367/111 |
| 6,914,564 | B2 * | 7/2005 | Barras et al. | 343/700 MS |
| 2002/0047952 | A1 * | 4/2002 | Kawata | 349/58 |
| 2002/0115478 | A1 * | 8/2002 | Fujisawa et al. | 455/567 |
| 2008/0112270 | A1 * | 5/2008 | Yeh et al. | 368/14 |

FOREIGN PATENT DOCUMENTS

KR 1020040086733 * 8/2006

* cited by examiner

*Primary Examiner* — Edward Urban
*Assistant Examiner* — Stacey Sorawat
(74) *Attorney, Agent, or Firm* — Birch, Stewart, Kolasch & Birch, LLP

(57) ABSTRACT

The present invention relates to a wrist watch type mobile terminal, and may include a conductive metal housing connected with a band or strap to be worn on a human body, and formed to be operable as an antenna at a specific bandwidth, a wireless communication module configured to process a signal transmitted and/or received by the housing, and a feeding portion configured to electrically connect the metal housing with the wireless communication module. The metal housing thereof may function as an antenna transmitting and/or receiving a specific bandwidth, and thus has an advantage of facilitating the implementation of the wireless performance and improving the appearance thereof, compared to a case in which an antenna is disposed within the housing having a small and limited size.

19 Claims, 9 Drawing Sheets

WRIST WATCH TYPE MOBILE TERMINAL

RELATED APPLICATION

The present disclosure relates to subject matter contained in priority Korean Application No. 10-2008-0109112, filed on Nov. 4, 2008, which is herein expressly incorporated by reference in its entirety.

BACKGROUND OF THE INVENTION

1. Field of the Invention

The present invention relates to a wrist watch type mobile terminal carried by a user to be worn on a human body such as an arm or wrist.

2. Description of the Related Art

Portable terminals can be easily carried and have one or more of functions such as supporting voice and video telephony calls, inputting and/or outputting information, storing data and the like.

As it becomes multifunctional, furthermore, the portable terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions. For example, a user interface environment is provided in order for users to easily and conveniently retrieve or select functions.

Furthermore, as being considered as a personal belonging, various designs for expressing his or her own personality may be also applicable to the portable terminals. The mechanical shape of a typical portable terminal is formed at a size that can be held by a user's hand, and the user carries the mobile terminal by holding it or putting it into his or her pocket, bag, or the like. Moreover, a wrist watch type mobile terminal allowing the user to be worn as a clothing, accessory, or wrist watch is also available, and in this case, it is required to provide excellent wireless performance without degrading the appearance thereof.

SUMMARY OF THE INVENTION

The present invention is contrived in view of the above-mentioned points, and an object of the present invention is to provide a wrist watch type mobile terminal allowing a user to be worn on a human body such as an arm or wrist, and provide excellent wireless performance while offering a small-sized appearance.

In order to accomplish the foregoing object, a wrist watch type mobile terminal according to the present invention includes a conductive metal housing connected with a band or strap to be worn on a human body, and formed to be operable as an antenna at a specific bandwidth, a wireless communication module configured to process a signal transmitted and/or received by the housing, and a feeding portion configured to electrically connect the metal housing with the wireless communication module.

As an example according to the present invention, an opening for mounting a display module may be formed on an upper surface of the housing.

As an example according to the present invention, the feeding portion may be disposed at an inner side of an edge portion of the opening.

As an example according to the present invention, an end portion of the feeding portion may be fixed to a circuit board, and formed to elastically contact with the housing during the assembly thereof.

As an example according to the present invention, a conductive metal cover may be mounted at a lower surface of the housing.

As an example according to the present invention, the cover may be assembled to make contact with the housing. On the contrary, the cover may be assembled to be apart from the housing by a predetermined gap.

As an example according to the present invention, a spacer may be provided between the cover and the housing, and the housing may be separated from the cover by the spacer.

As an example according to the present invention, a plurality of through holes may be formed at a lateral surface of the housing, and a plurality of push buttons may be provided to be operable by pressing them through each of the through holes, respectively.

As an example according to the present invention, at least one of the push buttons may be set to reset the mobile terminal when pressed for more than a predetermined period of time.

As an example according to the present invention, the wireless communication module may be configured to operate with an external terminal at a Bluetooth bandwidth.

As an example according to the present invention, the display module may be configured to output at least any one of call information, message information, and multimedia information by a signal received from the external terminal.

A wrist watch type mobile terminal according to the present invention may be expressed as follows. In other words, The wrist watch type mobile terminal includes a conductive metal housing connected with a band or strap to be worn on a human body, and a circuit board assembly built in the housing, wherein the circuit board assembly includes a display module, a circuit board, a frame configured to support the display module and the circuit board in an integrated form, and a feeding portion attached to the circuit board to make contact with the housing.

As an example according to the present invention, a battery may be further mounted on the frame.

As an example according to the present invention, an insertion protrusion may be formed on the frame to maintain a location of the circuit board assembly is within the housing, and an engagement groove may be formed on the housing to engage with the insertion protrusion.

As an example according to the present invention, a penetration groove may be formed at a side of the frame to penetrate the feeding portion therethrough.

As an example according to the present invention, the feeding portion may be formed with a C-shaped elastic spring.

The object and configuration of a portable terminal according to the present invention as described above will be more clearly understood through a detailed description according to preferred embodiments of the invention with reference to the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal according to the present invention will be described in more detail with reference to the accompanying drawings. A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used each other.

Figure 1:
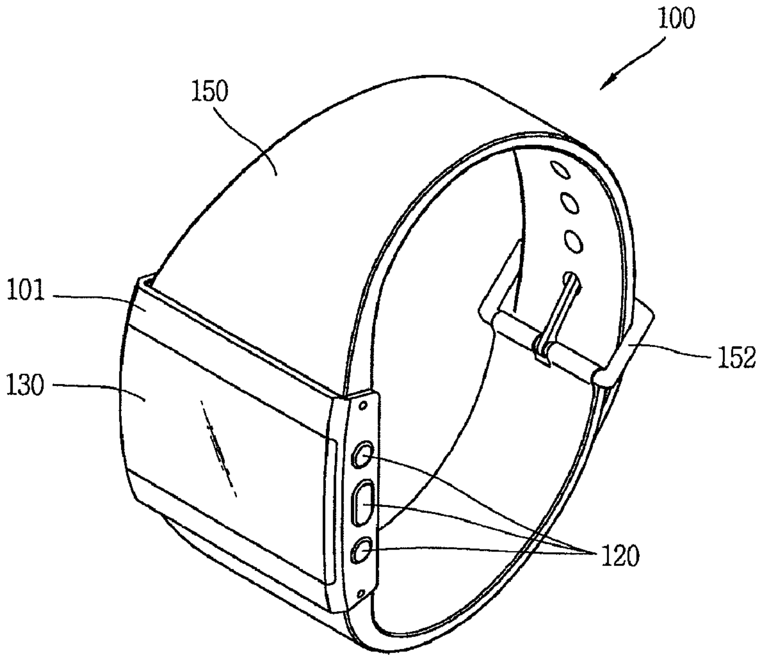
FIG. 1 is a front perspective view illustrating a wrist watch type mobile terminal according to the present invention.

FIG. 1 is a front perspective view illustrating a wrist watch type mobile terminal according to the present invention. As illustrated in FIG. 1, a wrist watch type mobile terminal 100 is provided with a metal housing 101 disposed such that a display 130 displaying time information is seen by the user through the upper surface thereof.

Both ends of the housing 101 are connected with a band 150 formed to be worn on a user's wrist or arm. The band 150 may be formed a leather, rubber, or a plastic, and also laminated with a plurality of single layers to form a multi-layer structure. The band 150 is provided with a fastener 152 for attaching the terminal main body 110 to the user's wrist or arm. The fastener 152 may be implemented by a hook structure capable of a buckle or snap-fit, Velcro™, or the like, and may include a partly elastic section. FIG. 1 illustrates an example in which the fastener 152 is formed in a buckle type.

Furthermore, a wireless communication module for performing a communication with a base station, server device, or external communication system over a communication network is provided within the housing 101. In particular, a short-range communication method, for example, Bluetooth™ may be used when it is used together with a server device or external communication system.

Figure 2:
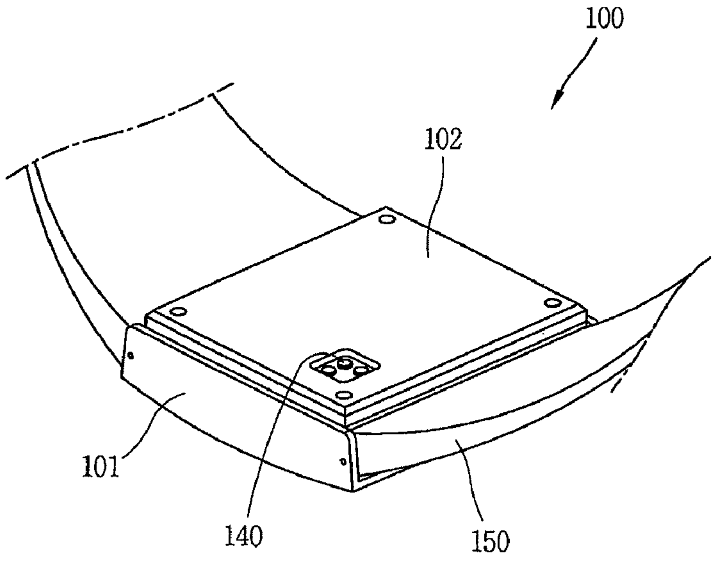
FIG. 2 is a rear perspective view illustrating a wrist watch type mobile terminal according to the present invention.

FIG. 2 is a rear perspective view illustrating a wrist watch type mobile terminal according to the present invention. As illustrated in FIG. 2, a rear surface of the wrist watch type mobile terminal 100 is covered with a cover 102, and a plurality of connecting terminals are provided to be exposed at a side of the cover 102. Those connecting terminals 140 may be used to transmit and/or receive data to and/from an external device, or receive power from a charging device.

The cover 102 may be formed of a conductive metal, and may be configured to electrically contact with the housing 101, or configured to maintain a predetermined gap with the housing 101 as will be described later.

Figure 3:
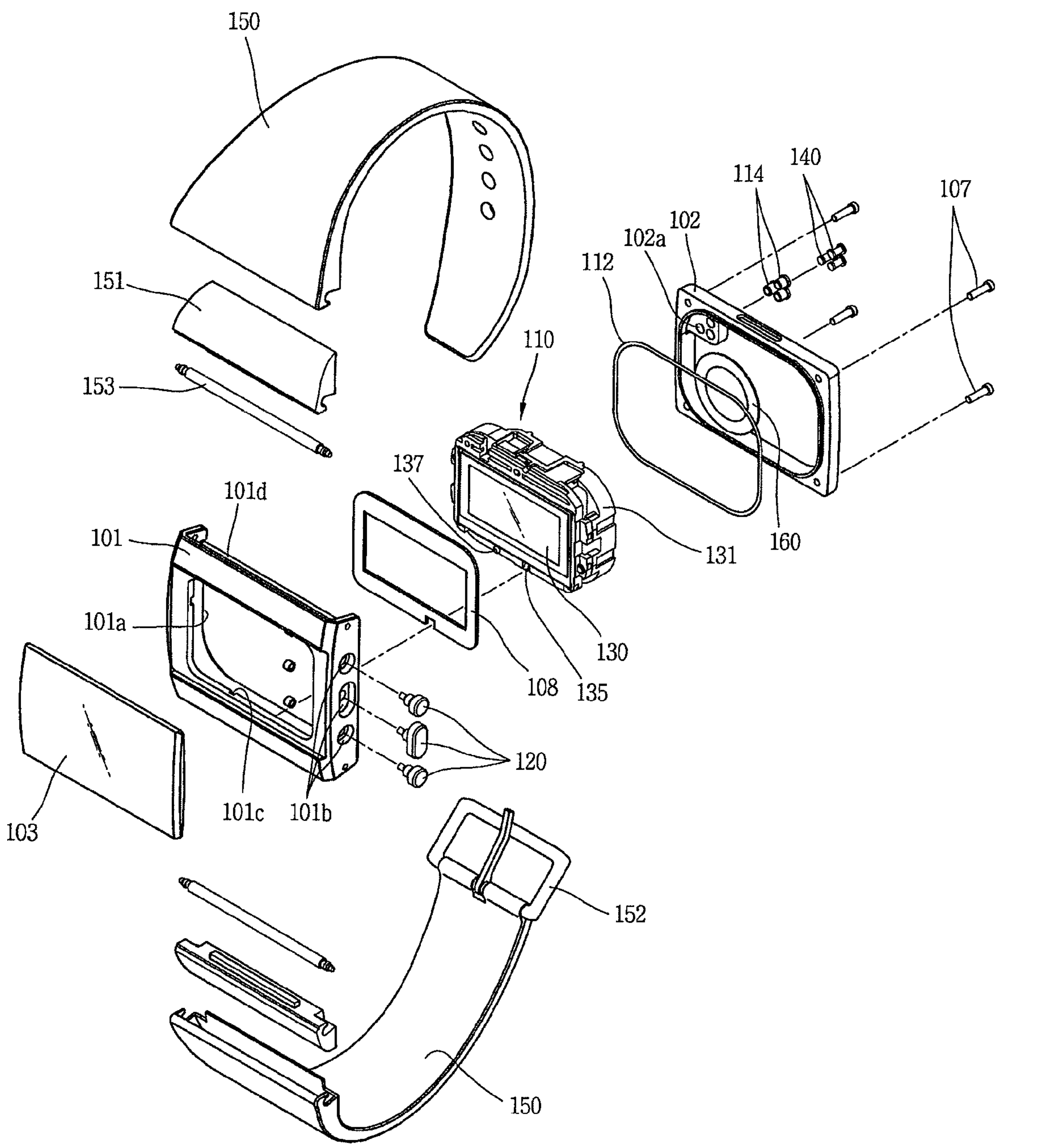
FIG. 3 is an exploded perspective view illustrating a wrist watch type mobile terminal according to the present invention.

FIG. 3 is an exploded perspective view illustrating a wrist watch type mobile terminal according to the present invention.

A groove 101*d* for connecting to the band 150 by a pin 153 is formed at both ends of the housing 101. A dielectric supporting body 151 may be attached to an end of the band 150 to provide rigidity and stably support the pin 153.

A window 103 is attached to an upper surface of the housing 101. The window 103 may be formed of plastic or reinforced glass, and may include a transparent region as large as the area of the display 130 allowing the user at least to view the display 130 therethrough. Moreover, the window 103 may additionally include a touch sensing member for allowing an input by a touch method (including a proximity touch as well as a direct contact) while viewing the display 130. The touch sensing member may be provided in the form of a transparent sheet including a transparent electrode pattern.

An integrated circuit board assembly 110 fabricated with the display 130, a circuit board 115, and the like, is disposed within the housing 101. The display 130, the circuit board 115, and the like, may be fixed to a frame member 131 and fabricated in an integrated form, and the circuit board assembly 110 may be configured to be directly mounted on the housing 101. In this case, an engagement groove 101*c* may be formed at the housing 101 such that the circuit board assembly 110 maintains a location within the housing 101, and a insertion protrusion 137 for being inserted into the engagement groove 101*c* may be formed at the circuit board assembly 110.

A shock-absorbing member 108 for protecting the display 130 from a shock is provided between the circuit board assembly 110 and the housing 101. A cut-off portion through which a feeding portion 135 passes is formed at a side of the shock-absorbing member 108, which will be described later.

The cover 102 is coupled to the housing 101 by a fixing member 107 such as a screw. A sealing member 112 is disposed between the cover 102 and the housing 101 to prevent water or alien substances from infiltrating thereinto.

The connecting terminals 140 are fixed to the cover 102 in the state of being inserted into through holes 102*a* formed at the cover 102. The connecting terminals 140 are configured to be surrounded by insulation sealing members 114 in order to maintain an insulation state between the connecting terminals 140 and the cover 102 as well as to prevent water or alien substances from infiltrating thereinto. The insulation sealing members 114 maintain a predetermined gap between an inner wall surface of the through holes 102*a* and the connecting terminals 140 while sealing an inner space of the housing from the outside.

A speaker 160 for outputting various alerting sounds of the wrist watch type mobile terminal 100 or reproduced sounds of multimedia may be provided on an inner surface of the case 102. A piezoelectric-type speaker may be applicable to the speaker 160 to implement the mobile terminal having a slimmer thickness.

A plurality of through holes 101*b* for mounting push buttons 120 are formed at a lateral surface of the housing 101.

Sealing members for waterproof may be additionally provided between the push buttons 120 and the through holes 101*b*.

The housing 101 is formed of a conductive metal to transmit and/or receive a specific bandwidth, and a feeding portion 135 is provided in the form of an elastic spring to make contact with an inner side of the housing 101. In other words, the housing 101 functions as an antenna transmitting and/or receiving radio signals at a specific bandwidth, and the radio signals transmitted or received through the housing 101 are processed by a wireless communication module included in the circuit board assembly 110. Such a configuration may effectively reduce wireless performance degradation caused when a separate antenna is mounted within the metal housing 101.

Figure 9:
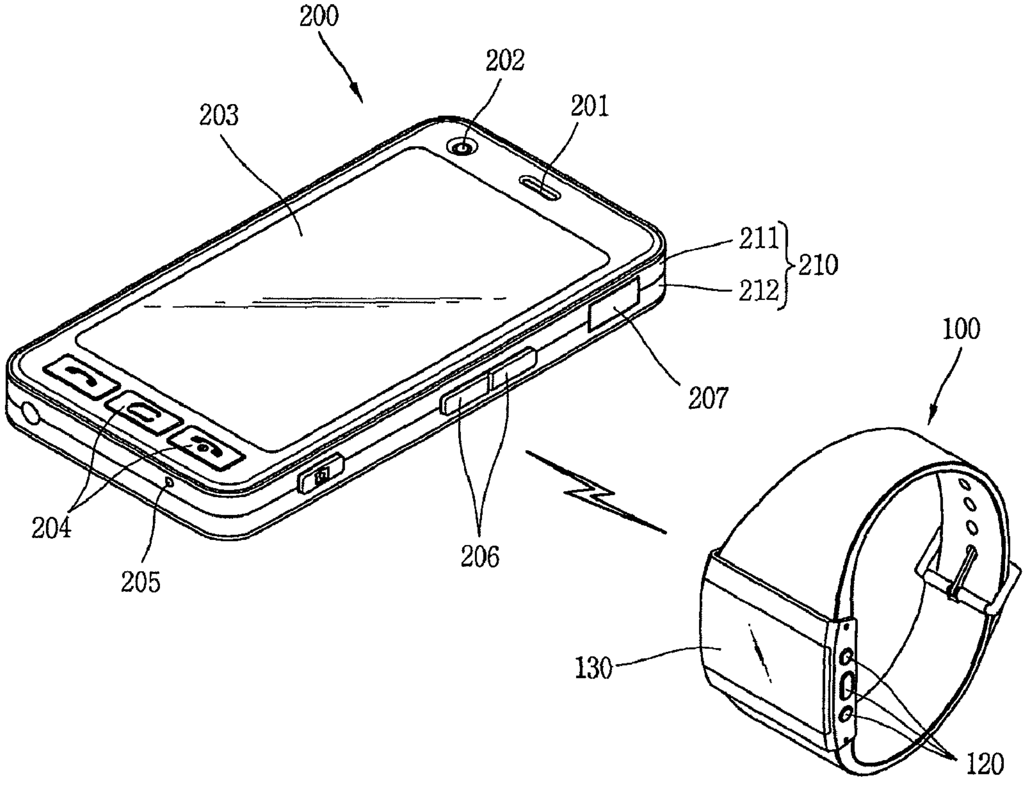
FIG. 9 is a perspective view illustrating a relation of a wrist watch type mobile terminal and a main terminal according to the present invention.

The specific bandwidth transmitted and/or received through the housing 101 may be determined whether or not it is a relatively low power consuming bandwidth capable of performing a wireless communication with an external terminal or system. It is advantageous in the aspect of specific absorption ration (SAR), which is often regarded as a demerit, especially when the metal housing 101 becomes an antenna radiator. The wrist watch type mobile terminal 100, as illustrated in FIGS. 1 through 4, may be used as an auxiliary device or accessory located at a short distance from a main terminal 200 as illustrated in FIG. 9. In this case, the wrist watch type mobile terminal 100 is set to operate at the Bluetooth bandwidth of 2400-2483.5 MHz using an output power of several tens of milliwatts. Accordingly, electromagnetic waves that can be absorbed into the user's human body will be negligible in the aspect of SAR, and therefore, the radiation from the housing 101 may have an appropriate advantage when operating at the Bluetooth bandwidth. Moreover, a wrist watch type mobile terminal 100 that is used as an accessory when performing a short-range communication will be mainly used to receive radio signals, thereby providing excellent wireless performance as well as reducing the danger of electromagnetic waves.

In FIG. 3, a case is taken as an example in which a feeding portion 135 is disposed, but it may be possible that a ground feeding portion may be additionally disposed, and the feeding portion 135 may be also located at a different position from the drawing of FIG. 3. The matching portions based on the quantity or position of feeding portions may be further provided for securing the performance and tuning.

Figure 4:
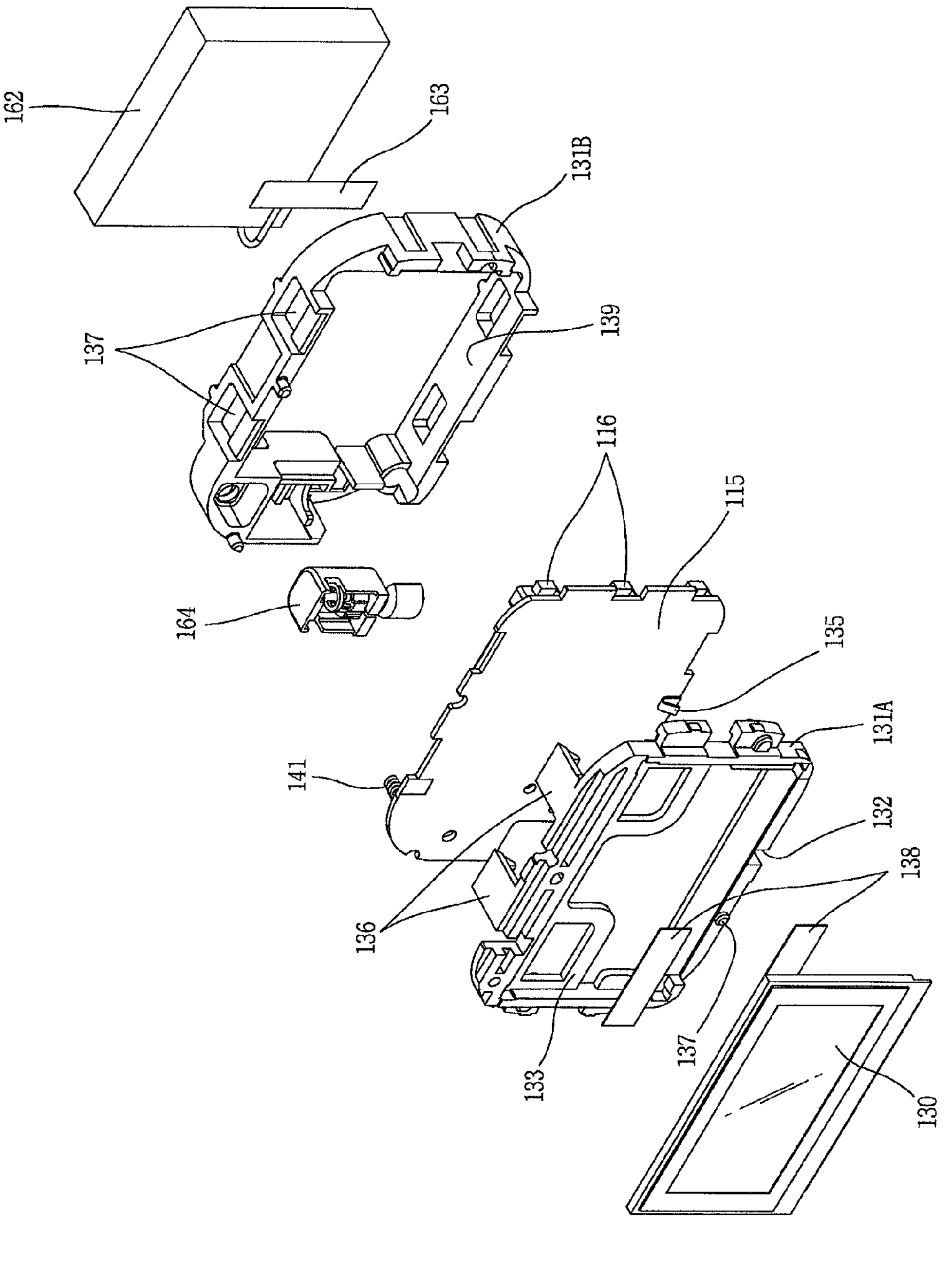
FIG. 4 is an exploded perspective view illustrating a circuit board assembly.

FIG. 4 is an exploded perspective view illustrating a circuit board assembly.

As illustrated in FIG. 4, the circuit board assembly 110 includes a display 130, a first frame 131A, a circuit board 115, a second frame 131B, and a battery 162.

For the display 130, various types of displays for visually expressing information may be used such as liquid crystal display (LCD), organic light emitting diodes (OLED), transparent OLED (TOLED), e-paper, or the like.

The first frame 131A and the second frame 131B may be configured to support a circuit board 115 positioned therebetween, and may be combined with each other. Specifically, a hook 136 is formed at the first frame 131A, and a engagement groove 137 for engaging with the hook 136 is formed at the second frame 131B.

The circuit board 115 includes a wireless communication module for processing signals transmitted and/or received through the feeding portion 135 and a processor for controlling input and output elements thereon.

The feeding portion 135 is attached to the circuit board 115. In addition, the feeding portion 135 may be formed with a C-shaped elastic spring. A through hole 132 may be formed at the first frame 131A to make contact with the housing 101 through the first frame 131A.

A mounting groove 133 is formed at the first frame 131A to mount the display 130 thereon, and an attachment sheet 138 is disposed between the mounting groove 133 and the display 130 to fix the display 130 thereto.

A battery housing portion 139 is formed at the second frame 131B to accommodate a battery 162. The battery 162 is connected to the circuit board 115 by means of an adhesive connecting member 163. A vibrator 164 is mounted at a side of the second frame 131B to generate vibration.

A plurality of conductive connecting members 141 in the form of a spring may be attached to the circuit board 115 to electrically connect the connecting terminals 140 mounted at the cover 102 to the circuit board 115 when the cover 102 is coupled with the housing 101. Each of the conductive connecting members 141 becomes in contact with a corresponding connecting terminal 140, thereby connecting the connecting terminals 140 exposed to an outside of the cover 102 to the circuit board 115.

Figure 5:
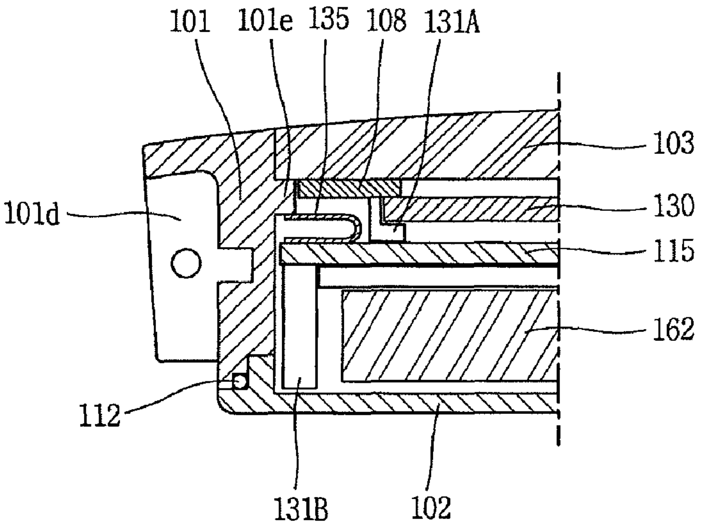
FIG. 5 is a cross-sectional view illustrating a feeding structure of a wrist watch type mobile terminal according to the present invention.

FIG. 5 is a cross-sectional view illustrating a feeding structure of a wrist watch type mobile terminal according to the present invention. As illustrated in FIG. 5, the feeding portion 135 may be in contact with an inner side surface of an edge portion 101*e* on a through hole 101*a* (refer to FIG. 3) of the housing 101. In other words, the feeding portion 135 may naturally make contact with the edge portion 101*e* of the through hole 101*a* when inserting the circuit board assembly 110 into an inner accommodating space of the housing 101.

In FIGS. 4 and 5, a case is taken as an example in which the feeding portion 135 is attached to the circuit board 115, but it may be also possible that the feeding portion 135 is disposed at the housing 101, and various modifications can be made for a shape of the feeding portion 135.

Figure 6:
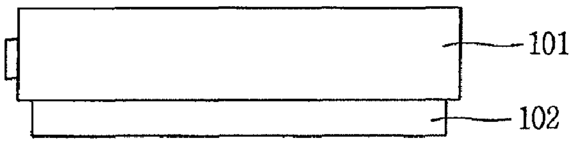
FIGS. 6 and 7 are lateral views illustrating different arrangements of a metal housing and a cover.
Figure 7:
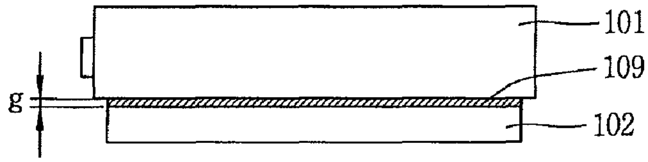
Figure 8:
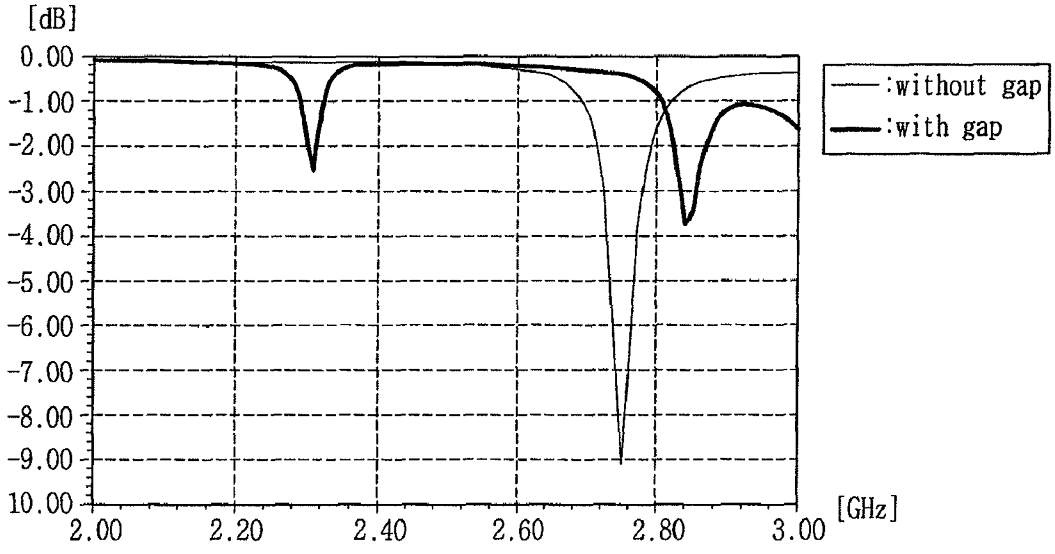
FIG. 8 is a diagram illustrating radio frequency characteristics in each case of FIGS. 6 and 7.

FIGS. 6 and 7 are lateral views illustrating different arrangements of a metal housing and a cover, and FIG. 8 is a diagram illustrating radio frequency characteristics in each case of FIGS. 6 and 7.

In these drawings, there are illustrated a case in which the conductive metal cover 102 is electrically short-circuited to the conductive metal housing 101 (FIG. 6) and a case in which the conductive metal cover 102 is separated and electrically floated from the housing 101 by a predetermined gap (g), respectively. In both cases, matching portions may be additionally provided to meet the performance conditions.

The metal cover 102 may not have a constant electrical contact to the housing 101 by the sealing member 112. Therefore, there may be presented a method in which the metal cover 102 is entirely adhered to the housing 101 as illustrated in FIG. 6, or a method in which the metal cover 102 is intentionally disposed at the housing 101 through an insulating spacer 109 by a predetermined gap (g) as illustrated in FIG. 7. The insulating spacer 109 may be formed of rubber or plastic.

Referring to FIG. 8, it is illustrated that a resonance is generated at the vicinity of about 2.75 GHz if there exists no gap (g), but a resonance is generated at the vicinity of about 2.55 GHz, or even about 2.82 GHz, if there exists a gap (g). In case of the configuration as illustrated in FIG. 7, the gap (g) between the housing 101 and the metal cover 102 induces an electromagnetic coupling. The arrangement of the metal cover 102 and the housing 101 may have an advantage that it can be positively utilized particularly for the variation of the radiation characteristics that can be created by a human body.

FIG. 9 is a perspective view illustrating a relation of a wrist watch type mobile terminal and a main terminal according to the present invention.

The wrist watch type mobile terminal 100 as described above may be utilized as an auxiliary device or accessory for the main terminal 200. In other words, the main terminal 200, as a handset device, or vehicle or stationary terminal, has the function of mobile communication, storage, multimedia processing, or the like, whereas the wrist watch type mobile terminal 100 receives a radio signal from the main terminal 200 to perform a specific function.

The main terminal 200 is provided with a bar-type terminal body 210, and the terminal body 210 thereof is provided with a case (casing, housing, cover, etc.) 211, 212. The shape of the terminal body 210 is not limited to an example as disclosed in FIG. 9, and may be applicable to a slide-type, a folder-type, or the like.

Furthermore, a touch screen 203, an audio output unit 201, an image input unit 202, and a first manipulation unit 204 may be arranged at a front surface of the terminal body 210.

The touch screen 203 includes a display unit for visually displaying information, such as a liquid crystal display (LCD) module, an organic light emitting diodes (OLED) module, an e-paper, or the like. Furthermore, the touch screen 203 may include a touch sensitive member for inputting information by a touch method. Accordingly, when there is a touch to any one place on the touch screen 203, the content corresponding to the touched position is entered. The content entered through the touch screen 203 may be a characters or numeral, or any menu item capable of instructing or specifying a function in various modes, or the like. The touch sensitive member may be a transparent material for allowing the user to view a display unit therein, and may include a structure for enhancing the visibility of the touch screen 203.

The audio output unit 201 may be implemented in the form of a receiver or loud speaker for transmitting the phone sound to the user's ear.

The first manipulation unit (or user interface) 204 may be distinguished from the touch screen 203 for inputting information by a touch method so as to be implemented as a dedicated input device. The first manipulation unit 204 may be formed in the form of a key or button using a push method.

The image input unit 202 may be implemented in the form of a camera module for capturing an image or video for the user or the like.

Furthermore, a second manipulation unit 206 and an audio input unit 205 may be arranged at a lateral surface of the terminal body 210.

The first and the second manipulation units 204, 206 may be commonly designated as a manipulating portion, and any method may be employed if it is a tactile manner allowing the user to perform manipulation with a tactile feeling. For example, the manipulating portion may be implemented using a dome switch, touch screen, or touch pad capable of receiving a command or information by a user's push or touch manipulation, or may be also implemented using a wheel or jog method for rotating a key or using a method of manipulating a joystick, or the like.

From a functional viewpoint, the first manipulation unit 204 is used for inputting commands such as start, end, scroll or the like, and the second manipulation unit 206 may functions as a hot-key carrying out a special function such as a control of controllable quantity of state (volume, luminance, menu retrieval, etc.), an activation of the image input unit 202, and the like.

The audio input unit 205 may be implemented, for example, in the form of a microphone to receive the user's voice and other various sounds.

Furthermore, an external interface 207 may be disposed at a lateral surface of the terminal body 210. The external interface 207 may serve as a link (passage or path) through which the terminal associated with the present invention can exchange data or the like with an external device. For example, the external interface 207 may be implemented as one of a connection port for connecting an earphone to the mobile terminal via a wired or wireless means, a port for short-range communication (e.g., an Infrared Data Association (IrDA) port, a Bluetooth™ port, a wireless LAN port, etc.), power supply ports for supplying power to the main terminal 200, or the like. The external interface 207 may be implemented in the form of a socket for accommodating an external card, such as a Subscriber Identity Module (SIM), a User Identity Module (UIM), a memory card for storing information, or the like.

Figure 10A:
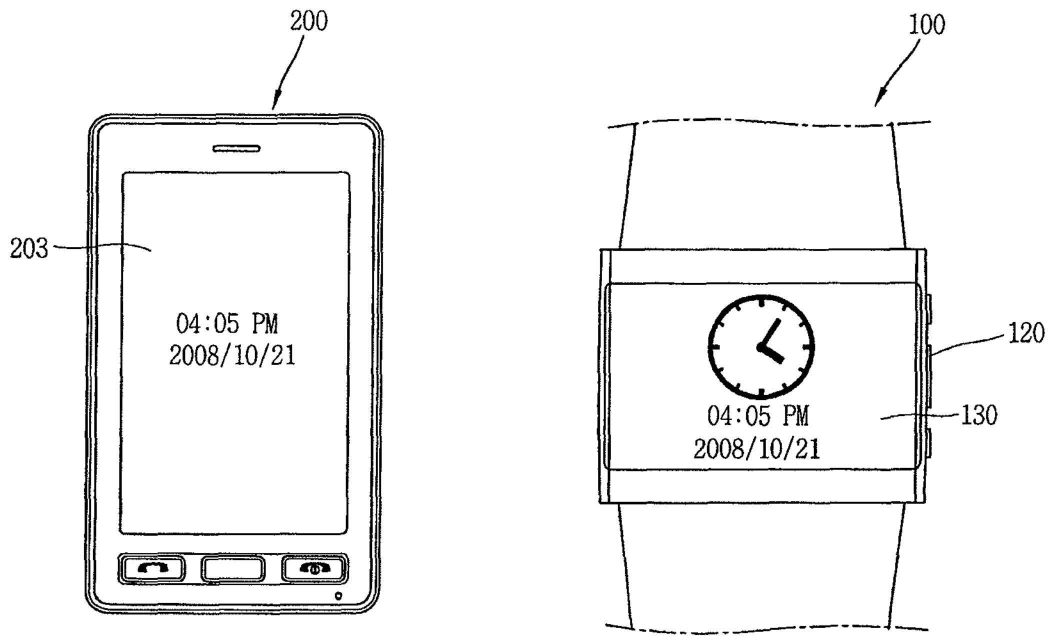
FIGS. 10A through 10C are plan views illustrating the output states of a wrist watch type mobile terminal according to the present invention based on the state of an external terminal.
Figure 10B:
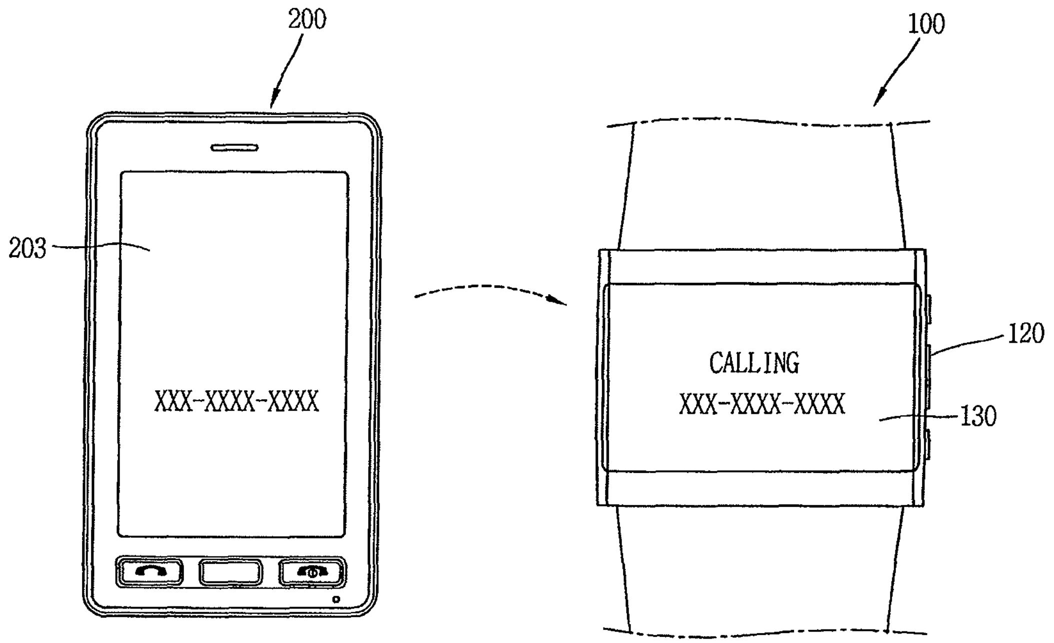
Figure 10C:
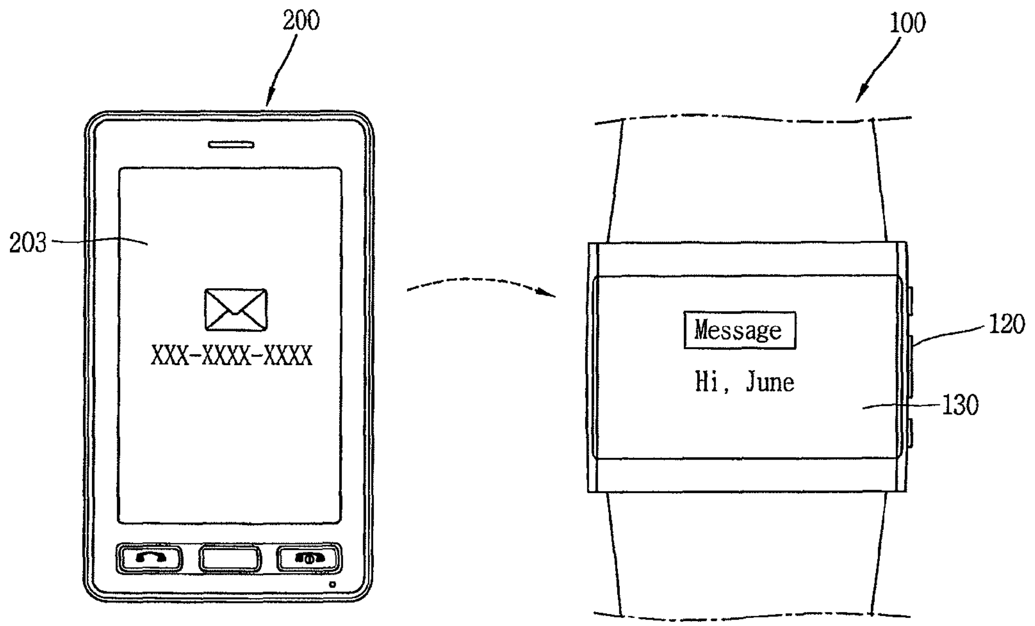

FIGS. 10A through 10C are plan views illustrating the output states of a wrist watch type mobile terminal according to the present invention based on the state of an external terminal.

FIG. 10A illustrates a case when the main terminal 200 is in a standby mode, and the display 130 of the wrist watch type mobile terminal 100 displays a watch or preset standby screen. In the standby mode, the wrist watch type mobile terminal 100 may be switched to a different mode by pushing a push button 120.

FIG. 10B illustrates a case when a phone call is received by the main terminal 200. The received information of the main terminal 200 is transmitted to the wrist watch type mobile terminal 100, and the caller's information, stored personal information, and the like, are displayed through the display 130 of the wrist watch type mobile terminal 100. When the user is located far from the main terminal 200, or unable to directly manipulate the main terminal, the user may recognize the reception of a call through the wrist watch type mobile terminal 100.

The reception of a call may be transferred to the user through a vibration signal of the vibrator 164 in addition to the output of the display 130.

FIG. 10C illustrates a case when a text message is received by the main terminal 200, and the received message information is once again transmitted to the wrist watch type mobile terminal 100, and the display 130 of the wrist watch type mobile terminal 100 displays an icon or graphic, the detailed content thereof, or the like. The message received by the wrist watch type mobile terminal 100 may be stored by manipulating the push button 120. The reception of a message may be notified to the user through a vibration signal of the vibrator 164 as well as the output of the display 130.

Figure 11A:
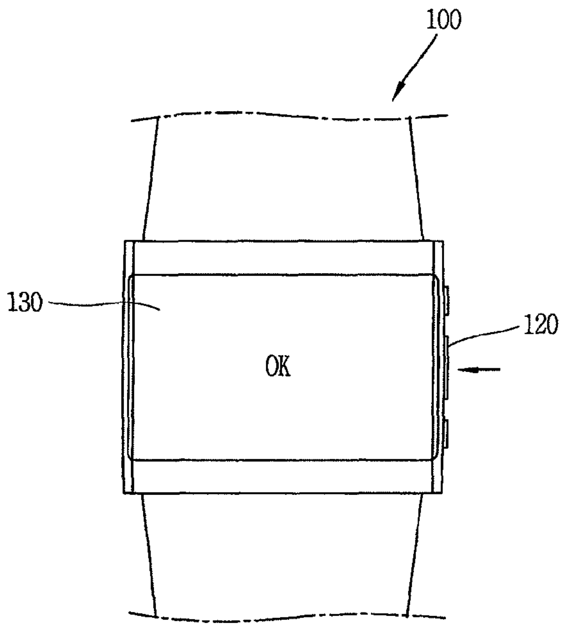
FIGS. 11A through 11C are operational state diagrams illustrating different functions implemented based on the pressing time of a push button.
Figure 11B:
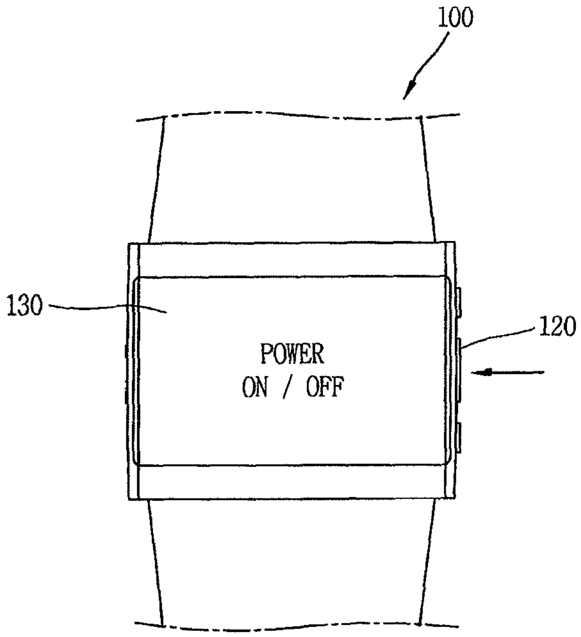
Figure 11C:
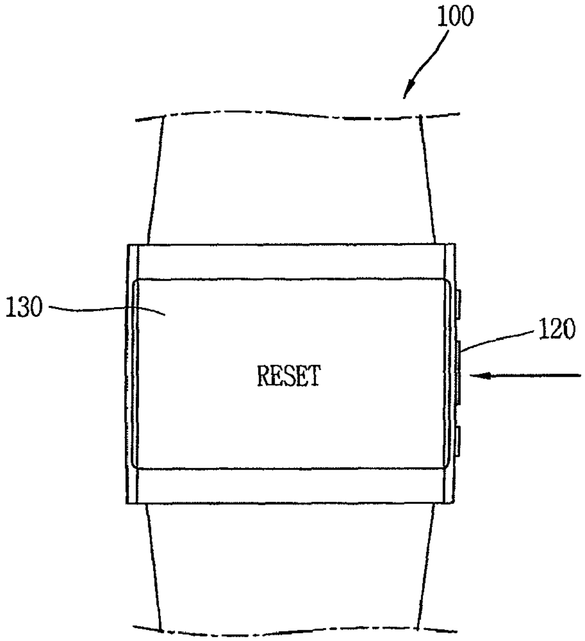

FIGS. 11A through 11C are operational state diagrams illustrating different functions implemented based on the pressing time of a push button.

If many buttons are mounted on the wrist watch type mobile terminal 100 having a small and limited size, it may degrade the appearance thereof as well as cause an incorrect input because the size of the buttons is reduced and also the distance from an adjacent button is decreased, and preferably, the number of buttons will be limited. Accordingly, the key value assigned to each button will be set to instruct or manipulate through a small number of buttons.

As such an example, the input function may be set in a different manner based on the pressing time of the push button 120. In other words, as illustrated in to FIG. 11A, a short-pressed click on any one of the push buttons 120, for example, may be set to "OK" for performing a specific menu or function.

Furthermore, as illustrated in FIG. 11B, power on/off will be performed when the push button 120 is continuously pressed for a predetermined period of time (for example, approximately 2-3 seconds).

In addition, as illustrated in FIG. 11C, it may be set to suspend and reset the process of a system when the push button 120 is pressed longer (for example, approximately 4-5 seconds) in the power-on state. When a system error happens and it is unable to perform the relevant function by pressing any push button 120, this setting allows the user to easily get out of an error state. It provides an advantage of effectiveness for a wrist watch type mobile terminal as in the present invention in which the battery 162 may not be easily separated.

Figure 12:
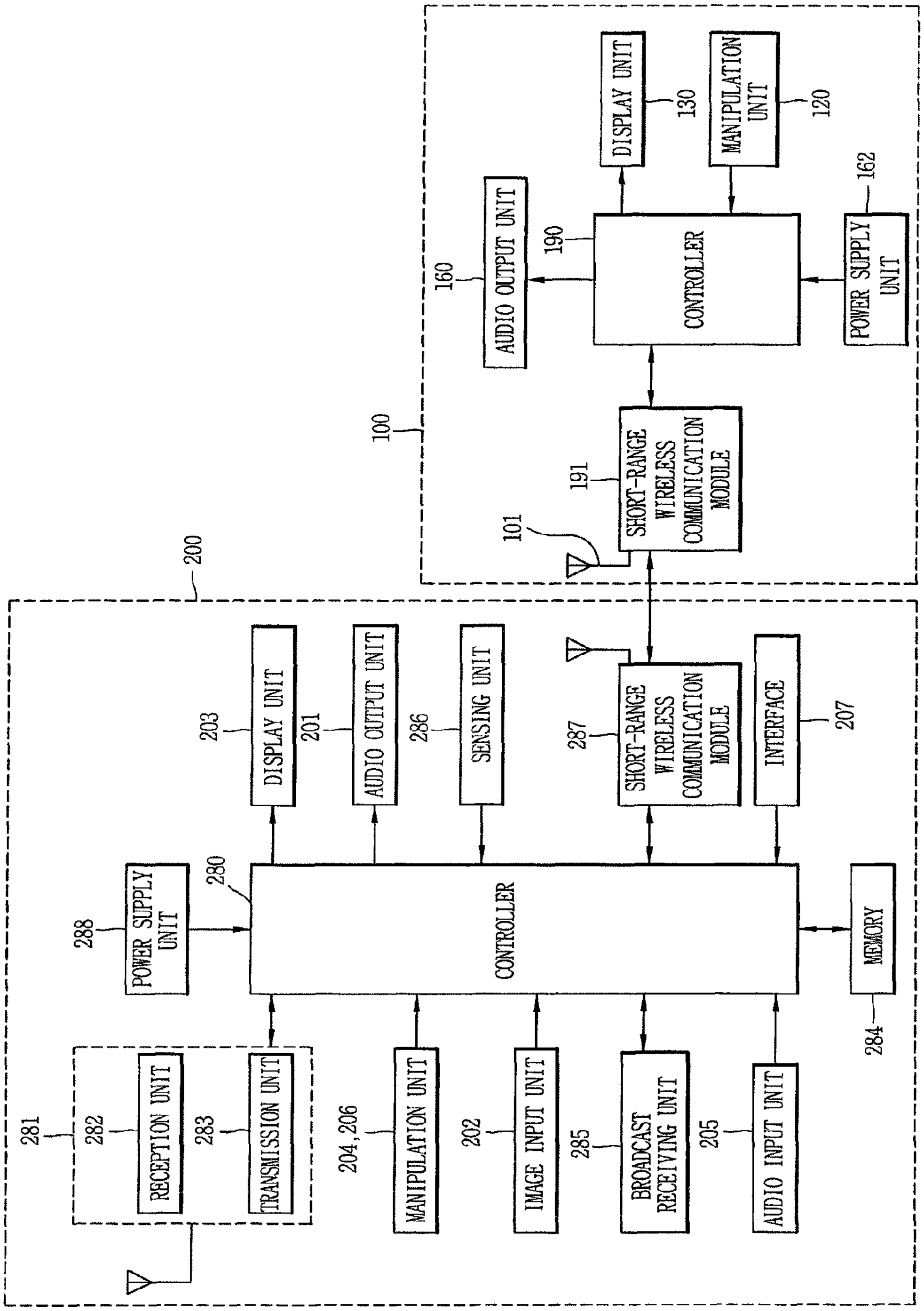
FIG. 12 is a block diagram illustrating a wrist watch type mobile terminal and a main terminal according to the present invention.

FIG. 12 is a block diagram illustrating a wrist watch type mobile terminal and a main terminal according to the present invention.

As illustrated in FIG. 12, a main terminal according to an example of the present invention includes a wireless communication module 281, manipulation units 204, 206, an image input unit 202, an audio input unit 205, a display unit 203, an audio output unit 201, a sensing unit 286, a short-range wireless communication module 287, an external interface unit 207, a broadcast receiving module 285, a memory 284, a power supply unit 288, a, and a controller 280. Furthermore, the wrist watch type mobile terminal 100 includes a controller 190, a power supply unit 162, a short-range wireless communication module 191, a display unit 130, and an audio output unit 160.

The controller 280 typically controls the overall operations of the main terminal. For example, the controller 280 performs the control and processing associated with telephone calls, data communications, video calls, and the like. In addition, the controller 280 is connected with the controller 190 of the wrist watch type mobile terminal 100 to provide a command for controlling the wrist watch type mobile terminal 100, or receive data from the wrist watch type mobile terminal 100, or receive the state information of the wrist watch type mobile terminal 100 and process the received information.

The wireless communication module 281 transmits and/or receives radio signals to and/or from a wireless communication base station through an antenna. For example, the wireless communication module 281 performs a transmission and reception function of audio data, text data, video date, and control data, and for this purpose, it includes a transmission unit 283 for modulating and transmitting signals to be transmitted, and a reception unit 282 for demodulating received signals.

The manipulation units 204, 206 are configured as illustrated in FIG. 9, and provides data inputted by the user for controlling the operation of a terminal to the controller 280.

The image input unit 202 processes image frames of still pictures or video obtained by image sensors in a video call mode or a capturing mode. The processed image frames may be converted into image data displayable on the display unit 203 and then displayed on a display unit 203.

The image frames processed by the image input unit 202 may be stored in the memory 284 or transmitted to the outside thereof via the wireless communication unit 281 by a control of the controller 280.

The audio input unit 202 may receive an external audio signal while the mobile terminal is in a particular mode, such as a phone call mode, a recording mode, a voice recognition mode, or the like. This audio signal is processed into digital data. In case of the phone call mode, the processed digital data is converted into a format transmittable to a mobile communication base station via the wireless communication module 281 and outputted to the wireless communication module. In case of the recording mode, the processed audio data is outputted to be stored in the memory 284.

The audio input unit 202 may include various noise removing algorithms to remove noise generated in the course of receiving the external audio signal.

The display unit 203 may output information processed in the portable terminal. For example, when the portable terminal is operating in a phone call mode, the display unit 203 will provide a User Interface (UI) or a Graphic User Interface (GUI) which includes information associated with the call by a control of the controller 280. As another example, if the main terminal is in a video call mode or a capturing mode, the display unit 203 may display images captured and/or received, UI, or GUI by a control of the controller 280. Moreover, the display unit 203 may display the state of the wrist watch type mobile terminal 100 in the form of an image, UI, or GUI by a control of the controller 280. If the display unit 203 is configured to have a touch screen, it is used as an input device in addition to the output device.

The audio output unit 201 may convert audio data received from the wireless communication module 281 or stored in the memory 284 and output the converted data in a call signal reception mode, a phone call mode, a recording mode, a voice recognition mode, a broadcast reception mode, and the like, by a control of the controller 280.

Also, the audio output unit 201 may provide audible outputs related to a up particular function (e.g., a call signal reception sound, a message reception sound, etc.) performed by the portable terminal. The audio output unit 201 may include a speaker, a receiver, buzzer, or the like.

The sensing unit 286 detects a current status of the portable terminal such as an open/close state of the mobile terminal, a location of the portable terminal, presence or absence of user contact with the mobile terminal, etc., and generates a sense signal for controlling the operation of the portable terminal. For example, if the portable terminal is a slide-type phone, the sensing unit 286 senses that the slide phone is closed or opened, and outputs the sensed result to control the operation of the terminal. In addition, the sensing unit 286 can perform a sensing function as to whether or not the power supply unit 288 supplies power or whether or not the external interface unit 207 is coupled with an external device.

The external interface unit 207 may serve as an interface with at least one external device connected with the portable terminal. For example, the external devices may include a wired/wireless headset, an external power charger, a wired/wireless data port, a card socket (e.g., for receiving a memory card, a Subscriber Identity Module/User Identity Module (SIM/UIM) card, etc.), and the like. The external interface unit 207 may be used to receive data or power from an external device and transfer the received data or power to each of the elements within the portable terminal, or may be used to transfer data from the portable terminal to another external device.

The memory 284 may store programs, or the like, for processing and controlling the controller 280, or may temporarily store inputted/outputted data (e.g., a phonebook, messages, still images, video, etc.). The memory 284 may include at least one type of storage medium including a hard disk type, a card-type memory (e.g., SD or XD memory, etc), a flash memory, a Random Access Memory (RAM), a Read-Only Memory (ROM), and the like.

The broadcast receiving module 285 may receive a broadcast signal transmitted through a satellite or terrestrial means, convert the same into a broadcast data format that can be outputted to the audio output unit 201, the display unit 203, and output the converted data to the controller 280. In addition, the broadcast receiving module 285 may receive supplementary data (e.g., Electronic Program Guide (EPG), a channel list, etc.) associated to a broadcast. The broadcast data and supplementary data converted by the broadcast receiving module 285 may be stored in the memory 284.

The short-range wireless communication module 287 is wirelessly connected to the wrist watch type mobile terminal 100 and other auxiliary devices to transmit and/or receive necessary control signals.

The power supply unit 288 is provided with internal or external power to supply power, which is required for operating the elements by a control of the controller 280.

The controller 190 of the wrist watch type mobile terminal 100 receives a control signal transmitted from the main terminal 200 to output audio information through the audio output unit 160, or visually output image information through the display unit 130, or transmit the state information of the power supply unit 162 to the main terminal.

The display unit 130 may be configured to output at least one of the call information, message information, and multimedia information by a signal received from the main terminal 200.

According to a wrist watch type mobile terminal associated with the present invention as described above, a metal housing thereof functions as an antenna transmitting and/or receiving a specific bandwidth, and thus has an advantage of facilitating the implementation of the wireless performance and improving the appearance thereof, when compared to a case in which an antenna is disposed within the housing having a small and limited size.

According to another aspect of the present invention, a display unit, a circuit board, and a feeding portion may be provided in an integrated form, thereby allowing the user to obtain a wrist watch type mobile terminal capable of facilitating the assembly and mounting thereof and having an excellent contact reliability of the feeding portion.

A watch-type portable terminal as described above is not limited to the configurations and methods of the foregoing embodiments, but all or part of each embodiment may be selectively combined with each other so as to implement various modifications of the embodiments.

What is claimed is:

1. A wrist watch type mobile terminal comprising:

a conductive metal housing formed to be operable as an antenna receiving signals;

a display displaying images using the signals;

a shock-absorbing member disposed between the housing and the display to protect the display from a shock transferred via the housing;

a cut-off side formed at a side of the shock-absorbing member;

a circuit board having a wireless communication module configured to process at least one of a signal to be transmitted by the housing and a signal received by the housing;

a feeding portion which is disposed on an edge portion of the circuit board, the feeding portion passing through the cut-off side to connect the housing to the wireless communication module; and a band or a strap connected to the housing, whereby the wrist watch type mobile terminal is capable of being worn, wherein an opening for mounting the display is formed on an upper surface of the housing, the feeding portion is disposed at an inner side of an edge portion of the opening, and an end portion of the feeding portion is fixed to the circuit board, and another end portion of the feeding portion is resiliently biased to contact the housing.

2. The wrist watch type mobile terminal of claim 1, further comprising a conductive metal cover mounted at a lower surface of the housing.

3. The wrist watch type mobile terminal of claim 2, wherein the cover directly contacts the housing.

4. The wrist watch type mobile terminal of claim 2, wherein the cover is spaced apart from the housing so as to not directly contact the housing.

5. The wrist watch type mobile terminal of claim 4, wherein an insulating spacer is provided between the cover and the housing.

6. The wrist watch type mobile terminal of claim 1, further comprising a plurality of push buttons, wherein a lateral surface of the housing includes a plurality of through holes formed therein, and each of the push buttons is provided in a corresponding through hole to be pressably operated therethrough.

7. The wrist watch type mobile terminal of claim 6, wherein at least one of the plurality of push buttons is set to reset the mobile terminal when pressed for more than a predetermined period of time.

8. The wrist watch type mobile terminal of claim 1, wherein the wireless communication module is configured to operate with an external terminal at a BLUETOOTH bandwidth.

9. The wrist watch type mobile terminal of claim 1, wherein the wireless communication module is configured to communicate with an external terminal within a bandwidth of about 2400 MHz to 2483.5 MHz.

10. The wrist watch type mobile terminal of claim 1, wherein the display is configured to output at least any one of call information, message information, and multimedia information by a signal received from an external terminal.

11. The wrist watch type mobile terminal of claim 1, wherein the conductive metal housing is formed entirely of metal.

12. A wrist watch type mobile terminal comprising:

a conductive metal housing formed to be operable as an antenna receiving signals;

a circuit board assembly located in the housing, the circuit board assembly including:

a display displaying images using the signals;

a shock-absorbing member disposed between the housing and the display to protect the display from a shock transferred via the housing;

a cut-off side formed at a side of the shock-absorbing member;

a circuit board having a wireless communication module configured to process at least one of a signal to be transmitted by the housing and a signal received by the housing;

a feeding portion which is disposed on an edge portion of the circuit board, thee feeding portion passing through the cut-off side to connect the housing to the wireless communication module; and a frame configured to support the display and the circuit board; and a band or a strap connected to the housing, whereby the wrist watch type mobile terminal is capable of being worn, wherein an opening for mounting the display is formed on an upper surface of the housing, the feeding portion is disposed at an inner side of an edge portion of the opening, and an end portion of the feeding portion is fixed to the circuit board, and another end portion of the feeding portion is resiliently biased to contact the housing.

13. The wrist watch type mobile terminal of claim 12, wherein the display, the circuit board, and the frame are integrated to form an integrated circuit board assembly.

14. The wrist watch type mobile terminal of claim 12, further comprising a battery mounted on the frame.

15. The wrist watch type mobile terminal of claim 12, wherein an insertion protrusion is formed on the frame to maintain a location of the circuit board assembly within the housing, and an engagement groove is formed on the housing to receive the insertion protrusion.

16. The wrist watch type mobile terminal of claim 12, wherein a penetration groove is formed at a side of the frame to allow the feeding portion to extend therethrough.

17. The wrist watch type mobile terminal of claim 12, wherein the feeding portion is formed with a C-shaped elastic spring.

18. A system for transferring and receiving information, the system comprising:

an external terminal having a first wireless communication module configured to transmit and/or receive information; and a wrist watch type mobile terminal including:

a conductive metal housing formed to be operable as an antenna receiving signals;

a display displaying images using the signals;

a shock-absorbing member disposed between the housing and the display to protect the display from a shock transferred via the housing;

a cut-off side formed at a side of the shock-absorbing member;

a circuit board having a second wireless communication module configured to process at least one of a signal to be transmitted by the housing and a signal received by the housing;

a feeding portion which is disposed on an edge portion of the circuit board, the feeding portion passing through the cut-off side to connect the housing to the second wireless communication module; and a band or a strap connected to the housing, whereby the wrist watch type mobile terminal is capable of being worn, wherein an opening for mounting the display is formed on an upper surface of the housing, the feeding portion is disposed at an inner side of an edge portion of the opening, and an end portion of the feeding portion is fixed to the circuit board, and another end portion of the feeding portion is resiliently biased to contact the housing.

19. The system of claim 18, further comprising a frame configured to support the display and the circuit board.

* * * * *